United States Patent [19]
Koutlakis et al.

[11] Patent Number: 6,159,257
[45] Date of Patent: Dec. 12, 2000

[54] WATER-RESISTANT, GLASS-LIKE, POLYSACCHARIDE ABRASIVE GRITS AND METHOD OF MAKING SAME

[75] Inventors: George Koutlakis, Greenfield Park; Paul LeBlanc, St. Bruno, both of Canada

[73] Assignee: ADM Agri-Industries, Ltd., Decatur, Ill.

[21] Appl. No.: 09/176,548

[22] Filed: Oct. 21, 1998

[51] Int. Cl.⁷ ..................................................... C09K 3/14
[52] U.S. Cl. ................................................. 51/302; 51/293
[58] Field of Search ............................... 51/302, 303, 293

[56] References Cited

U.S. PATENT DOCUMENTS

| | | | |
|---|---|---|---|
| 2,383,988 | 9/1945 | Perry .......................................... | 51/293 |
| 2,426,072 | 8/1947 | Wall ........................................... | 51/282 |
| 2,622,047 | 12/1952 | Ayers ......................................... | 134/7 |
| 3,090,166 | 5/1963 | Straub ......................................... | 51/9 |
| 3,142,590 | 7/1964 | Hergonson ................................. | 134/7 |
| 3,424,616 | 1/1969 | Townsend .................................. | 134/7 |
| 3,485,671 | 12/1969 | Stephens .................................... | 134/7 |
| 3,706,598 | 12/1972 | Carrell ....................................... | 127/29 |
| 4,048,123 | 9/1977 | Hramchenko et al. .................. | 252/545 |
| 4,268,069 | 5/1981 | Stolfo ....................................... | 282/27.5 |
| 4,398,954 | 8/1983 | Stolfo ....................................... | 106/21 |
| 4,491,483 | 1/1985 | Dudacek et al. .......................... | 127/33 |
| 4,545,155 | 10/1985 | Nakata ....................................... | 51/320 |
| 4,659,391 | 4/1987 | Kuehn ........................................ | 134/7 |
| 4,673,438 | 6/1987 | Wittwer et al. .......................... | 106/126 |
| 4,731,125 | 3/1988 | Carr ........................................... | 134/17 |
| 4,734,222 | 3/1988 | Winterton et al. ...................... | 252/546 |
| 4,769,253 | 9/1988 | Willard .................................... | 426/559 |
| 4,832,706 | 5/1989 | Yates ......................................... | 51/293 |
| 4,844,937 | 7/1989 | Wilkinson et al. ...................... | 426/559 |
| 4,965,081 | 10/1990 | Lazarus .................................... | 426/242 |
| 4,990,348 | 2/1991 | Spratt et al. ............................. | 436/242 |
| 5,066,335 | 11/1991 | Lane et al. ................................ | 134/7 |
| 5,360,903 | 11/1994 | Lane et al. ................................ | 536/124 |
| 5,367,068 | 11/1994 | Lane et al. ................................ | 536/124 |
| 5,780,619 | 7/1998 | Lenz ......................................... | 536/123.1 |

FOREIGN PATENT DOCUMENTS

| | | |
|---|---|---|
| 74083 | 12/1987 | Australia . |
| 1094332 | 1/1981 | Canada . |
| 0164914 | 12/1985 | European Pat. Off. . |
| 0192542 | 8/1986 | European Pat. Off. . |
| 2922671 | 4/1980 | Germany . |
| 1508570 | 4/1978 | United Kingdom . |
| 2208651 | 4/1989 | United Kingdom . |

*Primary Examiner*—Michael Marcheschi
*Attorney, Agent, or Firm*—Laff, Whitesel & Saret, Ltd.

[57] ABSTRACT

The present invention relates to high amylose, water-resistant, glass-like polysaccharide abrasive grits and a method of making the same.

16 Claims, No Drawings

WATER-RESISTANT, GLASS-LIKE, POLYSACCHARIDE ABRASIVE GRITS AND METHOD OF MAKING SAME

FIELD OF THE INVENTION

The present invention relates to glass-like polysaccharides useful as abrasive grits and especially to water-resistant, glass-like, polysaccharide abrasive grits and to methods of making them.

BACKGROUND OF THE INVENTION

Abrasive grit materials are well known in the art and are commonly used as blast media in sand blasting operations. Typical applications for abrasive grit blast media include cleaning building exteriors, or removing surface coatings such as surface oxides on castings. In applications such as these, minor surface damage caused by the blasting operation is not of concern and abrasive grits which are relatively aggressive in removing surface coatings may be used. However, other applications exist in which the surface damage which results from the use of traditional abrasive grit blast media is unacceptable.

One example of a particularly sensitive application involves the military and commercial aircraft industry. The removal of paint from exterior aircraft surfaces is periodically required in order to allow technicians to inspect the underlying metal for corrosion and also for cosmetic purposes, such as a change in corporate identity. However, aircraft surfaces clad with aluminum or made of composite materials are particularly sensitive to damage caused by blast media.

Aircraft surfaces are typically clad with pure aluminum, which is softer than the underlying aluminum alloy the cladding is designed to protect. The soft layer of aluminum cladding is particularly susceptible to damage and erosion by traditional blast paint stripping operations, which can leave a very rough surface finish that is unacceptable in most situations. Such damage to the aluminum cladding can necessitate the replacement of whole sections of an aircraft's skin. Furthermore, methods used for stripping aluminum clad structures may not be acceptable for structures made of composite materials such as fiberglass, graphite and aramid (Kevlar) systems which are even more sensitive to damage from blast media.

Prior art blast media used in aircraft applications include synthetic abrasive grit materials composed of thermosetting resins such as epoxy resin, urea resin, unsaturated polyester resin, alkyd resin, or harder resins such as polystyrene, polycarbonate or acrylic. Although less aggressive than traditional blast media, plastic blast media are sufficiently aggressive when used in paint stripping applications that skilled handling by trained personnel is required in order to avoid permanent damage to aircraft skins. Moreover, use of such blast media can still result in reduced fatigue life, increased crack propagation and high surface roughness to the extent that such media is unacceptable for repeated use on aluminum clad or composite structures.

Gentler methods of paint removal involve the use of chemical solvents such as methylene chloride or phenol. However, stringent environmental legislation and health standards have rendered the use of such volatile organic chemicals in paint stripping operations both inconvenient and prohibitively expensive. In some cases, companies have postponed aircraft exterior surface maintenance programs rather than attempt to deal with the regulations and costs associated with chemical stripping.

A series of related patents, owned by the assignee of the present invention, describe an entirely new type of abrasive grit material. U.S. Pat. Nos. 5,066,335, 5,360,903 and 5,367,068 describe glass-like polysaccharide abrasive grit particles made from conventional starches, such as wheat and corn starches. The abrasive grit particles are comprised of polysaccharide molecules annealed into a glass-like solid in which moisture is occluded within the interstices of the matrix of polysaccharide molecules. The polysaccharide molecules may be partially cross-linked to increase the complexity of the matrix of polysaccharide molecules within the glass-like polysaccharide grit particles.

The glass-like polysaccharide abrasive grit compositions described by U.S. Pat. No. 5,367,068 enjoy several advantages over the prior art abrasive grits. Polysaccharide abrasive grits are less aggressive than plastic blast media, thereby avoiding the damage to aluminum clad structures caused by traditional blast stripping methods. As a result, use of polysaccharide abrasive grits is more forgiving and requires less skill in handling than the use of plastic blast media. Use of polysaccharide abrasive grits allows aluminum clad aircraft skins to be subjected to repeated paint-and-strip operations in comparison to plastic blast media. By way of contrast, some aircraft manufacturers limit paint stripping operations using plastic blast media to only once in the lifetime of an aircraft, due to the potential damage to the aircraft's surface. Furthermore, polysaccharide abrasive grits are acceptable for use with both aluminum and composite materials, allowing for complete nose-to-tail paint stripping operations of aircraft. Finally, abrasive grits made of polysaccharides such as wheat starch are non-toxic and biodegradable, reducing the health risks and disposal problems often associated with paint stripping operations. These advantages over other methods have allowed the glass-like polysaccharide starch grits described in U.S. Pat. No. 5,367,068 to gain wide acceptance in the industry for removing coatings from aircraft.

One shortcoming to the use of the prior art polysaccharide grit particles is that they are hygroscopic. When placed in contact with liquid water, the prior art grit particles tend to cake and agglomerate, absorbing water to the extent that they lose their integrity and form a non-particulated mass. Once in this state, the grit particles cannot be recovered by drying and are no longer usable as blast media.

The hygroscopic nature of prior art blast media can create operational problems when these materials come into contact with any water present in the blast equipment. In general, blasting operations involve the use of an air compressor to create an air stream in which the abrasive particles are suspended. The flow of abrasive particles is then concentrated and directed through a nozzle onto the surface to be treated. Water can enter into the blast equipment where incompletely dried compressed air is used, or where rapid depressurization causes condensation within pressure pot system and air supply lines. This problem is particularly acute in humid environments.

The failure to keep the blast equipment free of water can result in caking and agglomeration of the blast media, rendering it useless for its intended purpose, and can render the blast equipment ineffective by obstructing valves and clogging apertures within the blasting apparatus. Thus, use of the prior art polysaccharide blast media requires special precautions to ensure a dry air source for the compressor and blast equipment designed to minimize condensation in pressurized zones of the equipment. Moreover, these concerns are not limited to the equipment problems encountered during use. Caking and agglomeration of blast media may also arise during long term storage of the prior art polysaccharide blast media in extremely humid environments.

Another problem particular to the aircraft industry involves infiltration of abrasive grit blast media into the interior of the aircraft during blast stripping operations. The failure to properly mask and seal all joints and seams on the exterior surface of an aircraft prior to blast stripping may permit some abrasive grit material to infiltrate spaces containing sensitive systems, which could cause potential damage to such systems. Similarly, small cracks on the exterior surface may become filled with blast media, inter alia providing an inconsistent surface for receiving a coating. These problems are compounded by the difficulty in detecting the abrasive grit particles due to their small size and generally transparent or translucent appearance. The problems of detection can be exacerbated by the inaccessibility and poor lighting conditions of some interior spaces within aircraft. As a result, clean up of abrasive grit material from the interior of an aircraft can be laborious and time consuming, sometimes requiring substantial disassembly of the affected portion of the aircraft.

Thus, it would be desirable to provide polysaccharide grit particles which maintain their integrity when placed in contact with liquid water and which retain their usability as blast media after they are dried. In addition, there is a need for an abrasive blast media which may facilitate detection and clean up of abrasive grit particles that infiltrate the joints and seams present in treated surfaces.

SUMMARY OF THE INVENTION

These needs and other needs are satisfied by the present invention, which comprises a process for making water-resistant polysaccharide abrasive grit particles, wherein an aqueous dispersion of polysaccharides, having an average amylose content of at least 45% by weight, is heated at an elevated temperature for a time sufficient to form a gel. The aqueous dispersion of polysaccharides is preferably one in which all of the polysaccharides in the aqueous dispersion of polysaccharides have an amylose content of at least 45% by weight. In a more preferred embodiment, all polysaccharides in the aqueous dispersion of polysaccharides have an amylose content of at least 50% by weight and in one form an amylose content of at least 70% by weight.

The resulting gel is then subdivided and cooled to form a glass-like solid material. The glass-like solid material is then ground to form grit particles with an apparent hardness of 4.0 moh or less and an average moisture content of at least 5%. The resulting grit particles are water-resistant in that they maintain their integrity after being subjected to contact with water and retain their usability as abrasive grit particles after drying. In addition, the polysaccharide grit particles desirably exhibit a high degree of fluorescence to the unaided eye when exposed to ultraviolet light, facilitating detection and clean up after use.

Further objects, features and advantages of the present invention will become apparent from the following detailed description.

DETAILED DESCRIPTION OF THE PRESENT INVENTION

In accordance with the present invention, a process is described for producing abrasive water-resistant glass-like polysaccharide grit particles made from a starch having an average amylose content of at least 45% and having an apparent hardness of up to about 4.0 moh, which provides distinct advantages when compared to the prior art. As used herein, the term water-resistant means that the grit particles maintain their integrity after contact with liquid water for an extended period, such that after drying their capacity for use as blast media remains.

The abrasive grits produced by the process of the present invention have superior water-resistance and other advantageous properties when compared to abrasive grits produced from typical starches, such as common corn starches and common wheat starches.

As described in "Organic Chemistry" 3rd ed., Morrison & Boyd, Allyn & Bacon, Inc. (1973), polysaccharides are naturally occurring polymers, consisting of as many as hundreds or even thousands of monosaccharide units per molecule. One of the most important polysaccharides is starch. Starches are comprised of two fractions, amylose and amylopectin. Amylose consists of long linear chains of repeating D-(+)-glucose units, while amylopectin has a highly branched structure consisting of short chains of about 20–25 D-glucose units each.

In general, starches contain about one-quarter amylose and three-quarters amylopectin. For example, typical starches derived from commonly cultivated corn have an amylose content of about 28%, while common wheat starches have an amylose content of about 26%. It is such typical starches which are described as the starting materials for making the abrasive grits of U.S. Pat. No. 5,367,068.

However, some genetically engineered plant strains produce starches with high amylose content. It has been determined that when such genetically engineered, high amylose starches are used to produce abrasive grit particles, the resulting grit particles exhibit surprisingly improved and advantageous characteristics in comparison to grit particles produced from typical starches.

In particular, it has been found that when starches having a high amylose content, such as at least 45% amylose are used, grits produced from them have improved water-resistance and other advantageous properties. For example, Hylon V and Hylon VII (National Starch Company), starches derived from genetically engineered strains of corn, having amylose contents of about 55% and 70%, respectively, produce highly advantageous grit particles in accordance with the present invention. Other varieties of starch, such as pea starches having an amylose content of as much as 75%, may also be useful in producing water-resistant grit particles of the present invention.

In their native states, starches take the form of granules whose size and shape are characteristic of the plants from which they are derived. These granules are largely insoluble in water at ambient temperatures and, therefore, must be dispersed in aqueous solution in order to produce the water-resistant glass-like polysaccharide abrasive grit particles of the present invention. The process of dispersing starches is known as "gelatinization." Gelatinization occurs when an aqueous mixture of starch granules is heated until the starch granules are disrupted, ultimately dispersing into solution and creating a viscous mass or gel.

The process of making the glass-like polysaccharide grit particles of the present invention comprises the steps of: heating an aqueous dispersion of polysaccharides having an average amylose content of at least about 45% by weight, at an elevated temperature and time sufficient to produce a gel; subdividing and cooling the gelatinized polysaccharides to form a glass-like solid material; and grinding the glass-like solid material to form grit particles. The glass-like solid material forms without substantial volatilization of moisture, which is occluded within a matrix of polysaccharide molecules, producing grit particles having a moisture content from at least about 5% to about 30% by weight and a hardness of up to about 4.0 moh.

The aqueous dispersion of polysaccharides comprises polysaccharides with an average amylose content of at least about 45% by weight and desirably in which all of the polysaccharides have an amylose content of at least about 45% by weight. However, it is presently preferred that all polysaccharides within the aqueous dispersion of polysaccharides have an amylose content of at least about 50% by weight and in one form, at least about 70% by weight.

It is presently preferred to carry out the heating step by processing the aqueous dispersion of polysaccharides in an extruder apparatus. Extrusion expedites the processing by allowing higher temperatures to be employed and by providing more thorough heating and mechanical working of the aqueous dispersion of polysaccharides. Moreover, gelatinized polysaccharides produced by extrusion are generally more uniform than those produced by, for example, batch gelatinization. However, because excessive mechanical working of the gelatinized polysaccharides can adversely affect the ability of the resulting polysaccharide or starch matrix to hold the water in a substantially occluded condition, the specific mechanical energy input to the polysaccharide gel during gelatinization is preferably within a range of about 0.05 to 0.2 Kw/kg.

Gelatinization of the high amylose polysaccharides requires an extrusion temperature of at least about 75° C., but preferably proceeds at temperatures of up to about 120° C. in the heating step. However, if temperatures in excess of the boiling point of water are used, the process should be carried out under pressure to preclude damage to the structure of the grit particles which would be caused by expansion of the water within the matrix of the polysaccharide molecules, prior to formation of the glass-like solid.

Upon cooling, the polysaccharide gel forms a glass-like solid material. The glass-like solid material is then dried to remove excess moisture. Drying may take place at ambient temperatures over at least a 24 hour period. It is presently preferred to dry the glass-like solid material using a continuous fluidized-bed dryer operating at a temperature of about 85° C. to 95° C. for a period of 45 minutes. Drying times of at least 45 minutes are used to prevent agglomeration of the glass-like solid material that may otherwise occur where shorter drying times and/or elevated drying temperatures are used. After drying, the glass-like solid material is preferably allowed to cool and cure for up to 24 hours or more before grinding into grit particles.

After cooling and curing, the glass-like solid material may be ground to an appropriate particle size using a suitable apparatus, such as an impact mill. Particle size standards for abrasive grit materials adapted to be entrained in a pneumatic stream for use as blast media are established in the industry. Accordingly, abrasive grit materials are ordered according to a standard particle size, such as 12/60 mesh. This standard means that all of the particles will pass through 12 U.S. mesh but none will pass through 60 U.S. mesh. Particle sizes finer than 100 U.S. mesh are generally considered ineffective as abrasive grits.

A variety of starches may be used to produce the glass-like polysaccharide grits of the present invention. As stated, the use of starches with higher amylose content, such as the genetically engineered corn starches Hylon V and Hylon VII, typically requires a much higher gelatinization temperature than do starches derived from common cultivated plants. For example, the gelatinization temperature of common corn starch ranges from about 62° C. to 72° C., while common wheat starch typically requires a temperature of about 58° C. to 64° C. In contrast, Hylon V (55% amylose) minimally requires a gelatinization temperature of about 70° C. to 88° C., while Hylon VII (70% amylose) minimally requires a temperature of about 72° C. to 92° C., at ambient pressures.

The moisture contents of the glass-like polysaccharide grits may also be varied. Varying the moisture content affects the apparent hardness and integrity of the glass-like polysaccharide grits. In general, the more water that is present in the glass-like polysaccharide, the greater the resiliency of the resulting material, the lower the apparent hardness and the less aggressive the abrasive grit product. On the other hand, the lower the moisture content of the glass-like polysaccharide, the more brittle the material is likely to be, with a resultant loss of particle integrity, namely a greater rate of particle breakdown and therefore, higher grit costs to the user. Moreover, thermal hydrolysis of the polysaccharides is more likely to occur at a low moisture content, which is not generally desirable. Thus, although it is possible to achieve a moisture content as low as 5%, the moisture content of the glass-like polysaccharides is preferably between about 10% to about 30% by weight and most preferably, in the range of about 10% to about 20% by weight.

The apparent hardness and integrity of the glass-like polysaccharide grits may also be affected by hydrolytic modification of the starch. The length of the polysaccharide polymers affects the molecular forces which play a role in forming the glass-like polysaccharides. Starches which have been hydrolytically modified form glass-like polysaccharides which are generally more brittle than glass-like polysaccharides based on comparable unhydrolysed starches. Thus in one form of the present invention, the aqueous dispersion of polysaccharides comprises a starch with a dextrose equivalent of about 10 or less and more preferably, a starch which is substantially unhydrolysed (i.e. having a dextrose equivalent of about 1 or less).

The Examples herein below are illustrative of methods of producing preferred starch-based glass-like polysaccharide grit particles of the present invention.

EXAMPLE 1

Glass-like polysaccharide grit particles were prepared in accordance with this example, using a Buss Kneader single screw extruder equipped with a low intensity screw to minimize the mechanical energy imparted to the product. The screw diameter was 140 mm and the extruder barrel had a length of about 1540 mm. A crosshead extruder was present at the end of the extruder barrel, with a die plate having 169 holes of 3.6 mm in diameter. A face cutter equipped with two knives operating at 5 rpm was used to cut the polysaccharide gel into pellets as it exited from the die plate.

The extruder barrel was provided with two processing zones. The first processing zone was a feed zone having dry and liquid feed ports through which both dry starch and liquid water feeds were introduced. The second processing zone contained a combination of screw mixing elements for mixing and heating the product. The crosshead extruder contained a non-compression screw with only conveying elements.

The extruder barrel was further equipped with three independent temperature control zones, comprising z1, the water heated screw, and z2 and z3, which were oil heated zones along the processing barrel. The crosshead extruder was equipped with two temperature control zones, comprising z4, the water heated screw, and z5, the oil heated crosshead barrel.

Temperature control zones z1, z2, z3, z4, and z5 were monitored by thermocouples t1, t2, t3, t4, t5 respectively. Thermocouple t6 was placed just before the die plate to measure the temperature of the polysaccharide gel at the die plate. The temperature control zones were adjusted to provide a gradual increase in temperature as the process of gelatinization proceeded along the length of the extruder.

The various temperature zones were controlled so that t6 did not exceed 120 degrees C.

Hylon V, a high amylose corn starch available from National Starch Co. with approximately 55% amylose content, was fed into the extruder through the dry feed port at a total throughput rate of approximately 360 kg/hr. Water was fed into the liquid feed port of the extruder to obtain a moisture content of approximately 25% by weight of the raw material feed. The extruder barrel screw speed was maintained at 115 rpm and the temperature was controlled by heating each respective temperature control zone to obtain the following temperatures:

t1: 70–72° C.
t2: 88–89° C.
t3: 103–108° C.
t4: 100–110° C.
t5: 94–103° C.
t6: 105–111° C.

These extrusion conditions resulted in an almost fully gelatinized starch with a translucent yellow coloration, having a temperature of 105° C.–111° C. and a die pressure of between 80 and 120 psi at the die plate. The gelatinized starch was cut into pellets of approximately 2.0 to 5.0 mm in length by the face cutter as it exited from the die plate. The pellets were gradually brought to a moisture content of bout 13%–15% by feeding them to a continuous fluidized-bed dryer operating at 105° C. Sufficient time was given during drying and post-extrusion handling of the pellets to prevent agglomeration of the pellets. A pellet classifier was used to separate fines or broken pellets from whole pellets.

The Rockwell hardness of the dried pellets was measured a minimum of 24 hours after extrusion and ranged from 72 to 86 on a Shore D scale.

EXAMPLE 2

Glass-like polysaccharide grit particles were prepared using a corn starch of higher amylose content. Using the same extruder as described in Example 1, Hylon VII (National Starch Company), a high amylose corn starch with approximately 70% amylose content, was fed into the dry feed port of the extruder at a total throughput rate of approximately 660 kg/hr. Water was fed into the liquid feed port of the extruder to obtain a moisture content of approximately 25% by weight of the raw material feed. The screw speed was maintained at 115 rpm and the temperature was controlled by heating each respective zone along the length of the extruder as follows:

t1: 48–53° C.
t2: 58–61° C.
3: 57–58° C.
4: 84–85° C.
5: 102–107° C.
6: 109–120° C.

These extrusion conditions resulted in an almost fully gelatinized starch with a translucent yellow coloration, having a temperature of 109° C.–120° C. and a die pressure ranging from 990 to 1050 psi at the die plate. The gelatinized starch was then cut into pellets of approximately 1.5 to 2.5 mm in length by the face cutter as it exited from the die plate. The pellets were gradually brought to a moisture content of about 11%–13% by feeding them to a continuous fluidized-bed dryer operating at a temperature range of 123° C.–132° C. Sufficient time was given during post-extrusion handling and drying of the pellets to prevent agglomeration of the pellets. A pellet classifier was used to separate fines or broken pellets from whole pellets.

The Rockwell hardness of the dried pellets was measured a minimum of 24 hours after extrusion and ranged from 75 to 82 on a Shore D scale.

EXAMPLE 3

The dried pellets produced in Example 1 were allowed to cool and cure for a minimum of 24 hours, then ground to form grit particles using a Pallmann Type PP8 impact mill available from Pallmann Maschinenfabrik GmbH & Co. KG, Wolfslochstrasse 51, Postfach 1652, Germany. Both grinding plates of the mill were kept stationary and the gap between the plates and the paddles of the mill was adjusted to the maximum. The dried pellets were fed into the impact mill at a grinding rate of approximately 450 kg/hr and the operating temperature was kept below 45° C.

The grit particles exiting the impact mill were sieved through a number 15 U.S. mesh screen and the overs were recycled through the impact mill. The grit particles were further sieved through a multiple deck sifter to yield two final grit particle distributions. These two grit particle distributions will be referred to as Type A 12/30 and Type A 30/50, to reflect the different sizes of the grit particles in each distribution. The particle size distribution data is as follows:

| Type A 12/30 | |
|---|---|
| Mesh size | % by weight retained on screen |
| 12 | 4.0% |
| 16 | 42.9% |
| 20 | 39.6% |
| 25 | 8.3% |
| 30 | 3.7% |
| +30 | 1.5% |

| Type A 30/50 | |
|---|---|
| Mesh size | % by weight retained on screen |
| 30 | 2.9% |
| 35 | 28.0% |
| 40 | 36.6% |
| 50 | 30.7% |
| +50 | 1.8% |

EXAMPLE 4

The dried pellets produced in Example 2 were allowed to cool and cure for a minimum of 24 hours, ground to form grit particles using a Pallmann Type PP8 impact mill and then sieved through a 15 U.S. mesh screen in the same manner as described in Example 3, with the overs being recycled through the impact mill.

The grit particles were then further sieved through a multiple deck sifter to yield two final grit particle distributions. These two grit particle distributions will be referred to as Type B 12/30 and Type B 30/50, to reflect the different sizes of the grit particles in each distribution. The particle size distribution data is as follows:

| Type B 12/30 | |
| --- | --- |
| Mesh size | % by weight retained on screen |
| 12 | 6.7% |
| 16 | 49.5% |
| 20 | 31.4% |
| 25 | 2.6% |
| 30 | 8.8% |
| +30 | 1.0% |

| Type B 30/50 | |
| --- | --- |
| Mesh size | % by weight retained on screen |
| 30 | 3.0% |
| 35 | 36.8% |
| 40 | 32.4% |
| 50 | 25.9% |
| +50 | 1.9% |

The high amylose glass-like polysaccharide grit particles of the present invention possess several advantageous physical properties in comparison to the prior art polysaccharide grits described in U.S. Pat. No. 5,367,068, including water-resistance, a high degree of fluorescence to the unaided eye when viewed under ultraviolet light, more efficient paint stripping rates, and lower breakdown rates. In addition to these advantageous qualities, the abrasive grit particles of the present invention retain the suitability for use as blast media for aluminum clad and composite materials and the nontoxic/biodegradeable qualities of the prior art polysaccharide grits.

The polysaccharide grit particles of the present invention exhibit water-resistance, by which it is meant that even after substantial exposure to liquid water for an extended period of time, the grit particles maintain their particulate character and recover their usability as blast media upon drying. In contrast, the prior art polysaccharide grit particles tend to cake and agglomerate, losing their particulate integrity and forming a non-particulated mass after contact with liquid water.

EXAMPLE 5

The water-resistance of the high amylose Type A 12/30 grit particles described in Example 3, Type B 12/30 grit particles described in Example 4, and Type B 16/60 grit particles prepared by the same procedure described in Examples 2 and 4, was compared to commercially available ENVIROSTRIP™ Starch Media (ADM/Ogilvie) 12/30 and 12/80, and POLYMEDIA LITE™ 75 20/50 grit particles (U.S. Technology Corp.). The ENVIROSTRIP™ 12/30 and 12/80 grit particles are based on typical unmodified wheat starch with an amylose content of about 28% by weight, prepared in accordance with the prior art U.S. Pat. Nos. 5,367,068. POLYMEDIA LITE™ 75 20/30 grit particles are based on typical wheat starch modified by grafting an acrylic polymer onto the polysaccharide backbone, as described in U.S. Pat. No. 5,780,619.

The water-resistance of each specimen of grit particles was measured by weighing approximately two grams of grit particles to the nearest 0.0001 gram and placing them in a preweighed centrifuge tube. The grit particles were then wetted by adding 40 ml of distilled water to each centrifuge tube. After shaking the tube vigorously, the suspension of grit particles in water was allowed to stand 10 minutes. During this time, the tubes were inverted 3 times at the 5 and 10 minute marks. Each tube sample was then centrifuged at 3500 rpm for 15 minutes. The supernatant or remaining water was then carefully decanted without disturbing the top layer of the wetted sample and the total weight of the tube and sample was recorded. The weight of the wetted sample was then calculated by subtracting the known weight of the tube. The hydration capacity, or ability to absorb water, was measured as the difference in sample weight before and after wetting, divided by the original weight of the sample.

The high amylose Type A 12/30, Type B 12/30, and Type B 16/60 polysaccharide grit particles absorb substantially less water when compared to commercial ENVIROSTRIP™ 12/30 and 12/80, and POLYMEDIA LITE™ 75 20/50 grit particles. The following hydration capacity results were obtained for Type A 12/30, Type B 12/30, Type B 16/60, ENVIROSTRIP™ 12/30 and 12/80, and POLYMEDIA LITE™ 75 20/50 grit particles, tested as described above.

| Comparison of Hydration Capacity of Type A 12/30, Type B 12/30 and 16/60, ENVIROSTRIP ™ 12/30 and 12/80 | |
| --- | --- |
| Abrasive Grit | Hydration Capacity at 25° C. |
| Type A 12/30 | 3.2 |
| Type B 12/30 | 3.1 |
| Type B 16/60 | 3.3 |
| ENVIROSTRIP ™ 12/30 | 6.9 |
| ENVIROSTRIP ™ 12/80 | 6.5 |
| POLYMEDIA LITE ™ 75 20/50 | 7.8 |

In addition to their increased resistance to absorption of water, the high amylose Type A 12/30, Type B 12/30, Type B 16/60 high amylose grit particles maintain their integrity upon exposure to liquid water, even for an extended period, retaining their usability as blast media after being dried. The prior art ENVIROSTRIP™ 12/30 and 12/80 grit particles, as well as the starch/acrylic POLYMEDIA LITE™ 75 20/50 grit particles, all tend to cake and agglomerate upon exposure to limited amounts of water, where the grit particles are present in excess. However, when immersed in excess of water, the ENVIROSTRIP™ 12/30 and 12/80 grit particles and POLYMEDIA LITE™ 75 20/50 grit particles tend to swell and form a fragile gel which readily disperses into a cloudy solution when disturbed. Thus, the ENVIROSTRIP™ 12/30 and 12/80 grit particles and POLYMEDIA LITE™ 75 20/50 grit particles are no longer useable as blast media after contact with or immersion in water, even after being dried.

In contrast, the high amylose grit particles of the present invention retain their particulate character after contact with or immersion in liquid water and may be used as blast media after drying. It has been found that, even after immersion in liquid water for two weeks, the Type A 12/30 grit particles retained their integrity and were usable as grit media after drying.

The increased water-resistance of the high amylose grit particles eliminates the need for special precautions to exclude moisture from blasting apparatus and allows the abrasive grit particles of the present invention to be used as "drop-in" replacements for prior art plastic bead media used with conventional blasting apparatus. In contrast, the commercially available ENVIROSTRIP™ 12/30 and 12/80 and POLYMEDIA LITE™ 75 20/50 grit particles require high quality dry compressed air to be fed to specially designed blast equipment. These precautions are needed in order to avoid any operational problems caused by moisture condensation forming within blasting equipment or pressurized vessels.

EXAMPLE 6

Another advantageous feature of the grit particles of the present invention is that they exhibit a high degree of visible fluorescence to the unaided eye when viewed under ultraviolet light or "black light." Thus, when viewed under ultraviolet light, the high amylose Type A 12/30 and Type B12/30 grit particles described in Examples 3 and 4 exhibit a high degree of fluorescence which is easily visible to the unaided eye. Such a degree of fluorescence is useful in that it facilitates the inspection of objects or surfaces treated with polysaccharide blast media for infiltration of the blast media into masked or sealed areas. It may also help in confirming that the treated surface is intact and does not contain small cracks or areas filled with blast media.

The prior art ENVIROSTRIP™ 12/30 grit particles exhibited a degree of fluorescence, which was observedly less intense than that of the high amylose Type A 12/30 and Type B12/30 grit particles. POLYMEDIA LITE™ 75 20/50 starch/acrylic grit particles exhibited a degree of fluorescence which was weaker than that observed for ENVIROSTRIP™ 12/30 grit particles. Type V PolyPlus 20/40 Plastic Abrasive (U.S. Technology Corp.) was not visibly fluorescent to the unaided eye. Thus, in contrast to the high amylose Type A 12/30 and Type B12/30 grit particles, the more limited degrees of fluorescence exhibited by the ENVIROSTRIP™ 12/30 grit particles and the POLYMEDIA LITE™ 75 20/50 grit particles is not likely to be as useful in facilitating the inspection of objects for infiltration or intrusion of blast media.

EXAMPLE 7

When used as an abrasive blast media, the high amylose glass-like polysaccharide grit particles of the present invention exhibit increased paint stripping rates in comparison to the prior art polysaccharide grit particles. High amylose Type A 12/30 grit particles described in Example 3 and Type B 12/30 grit particles described in Example 4, were compared to commercially available ENVIROSTRIP™ Starch Media (ADM/Ogilvie) of the same grit particle size.

Paint removal efficiency was tested using a modified direct pressure Pauli & Griffin hand cabinet, equipped with a 1 inch inside diameter blast hose and a ⅜ inch diameter nozzle of a double venturi type. Approximately 30 lbs of grit particles were loaded into the blast apparatus for each test. The blast apparatus was thoroughly cleaned prior to each test to ensure that the residual media from the previous test had been removed from the blast system.

Prior to blasting, the abrasive grit particle flow rate and pressure was calibrated and adjusted to give approximately 8 to 9 lbs per minute media flow at a nozzle pressure of approximately 30 psi, as measured at the nozzle for each test. Paint removal tests were performed manually by an operator. The blast nozzle was held a distance of 6 to 7 inches from the painted test panel with the aid of a guide attached to the nozzle. The angle between the nozzle and the panel was approximately 40 to 60 degrees.

The painted test panels to be stripped were prepared in accordance with United States Air Force Military Technical Order T.O. 1-1-8. The panels measured 12 inches by 12 inches and were prepared from 2024-T3 clad aluminum sheet 0.032 inches thick, meeting specification QQ-A-250-05F-T3. A polyamide epoxy primer and a polyurethane top coat was applied to the aluminum panels at an average dry coating thickness of 3.0 to 3.5 mils. The paint on these panels was cured at 70° F. and 50% relative humidity for 7 days, followed by curing in an oven at a temperature of 210° F. for 96 hours. The paint adhesion and quality of these panels met or exceeded aerospace requirements.

The paint removal efficiency of the ENVIROSTRIP™ 12/30 grit particles is dependent on the particle size. Previously unused 12/30 grit particles will have relatively low efficiency. Optimal efficiency is achieved with the broad particle size mix that results after the grit particles begin to fracture from repeated use. In order to conduct a meaningful evaluation of paint removal efficiency, each batch of grit particles was blasted for a minimum five cycles prior to use for removing paint. Type A 12/30 and ENVIROSTRIP™ 12/30 grit particles were blasted for five cycles prior to testing for paint removal, while Type B 12/30 grit particles were blasted ten cycles in order to give a comparable particle size mix.

The following paint removal rates reported in square feet per minute were obtained for Type A 12/30, Type B 12/30, and ENVIROSTRIP™ 12/30 grit particles when tested as described above.

| Comparison of paint removal rates of Type A 12/30, Type B 12/30, and ENVIROSTRIP ™ 12/30 | |
|---|---|
| Abrasive grit | Paint removal rate (sq. feet per minute) |
| Type A 12/30 | 0.51 |
| Type B 12/30 | 0.48 |
| ENVIROSTRIP ™ 12/30 | 0.30 |

The paint removal efficiency of ENVIROSTRIP™ 12/30 is considered to be reasonably fast when used in commercial applications. However, the high amylose Type A 12/30 and Type B 12/30 grit particles offer substantial improvements in paint removal efficiency.

EXAMPLE 8

It has been determined that the high amylose glass-like polysaccharide grit particles of the present invention exhibit increased resistance to breakdown during use, relative to the prior art polysaccharide abrasive grits. Accordingly, they retain their abrasive properties and can be recycled and reused more times than the prior art polysaccharide grit particles.

High amylose Type A 12/30 grit particles described in Example 3 and Type B 12/30 grit particles described in Example 4, were compared to commercially available ENVIROSTRIP™ Starch Media (ADM/Ogilvie) of the same grit particle size.

The breakdown rate of each abrasive grit was tested using a modified direct pressure Pauli & Griffin hand cabinet, equipped with a 1 inch inside diameter blast hose and a ⅜ inch diameter nozzle of a double venturi type. Approximately 30 lbs of grit particles were loaded into the blast apparatus for each test. Prior to each test, the blast apparatus was thoroughly cleaned to ensure that the residual media from the previous test had been removed from the blast system.

Prior to blasting, the nozzle was fixed above a table inside the blast cabinet. The abrasive grit particle flow rate and pressure were calibrated and adjusted to give approximately 8 to 9 lbs per minute media flow at a nozzle pressure of approximately 30 psi, as measured at the nozzle for each test. During each test, the blast nozzle was held at a constant 6 to 7 inches from the target blast surface with the aid of a guide attached to the nozzle. The angle between the nozzle and target surface was 45 degrees.

The target surface used was a 0.250-inch thick 7075 T-6 aluminum plate placed in the path of blast stream. The vacuum return on the blast cabinet was disabled and the grit particles were then blasted against the aluminum plate until all of the grit particles had emptied from the pressure pot. The spent grit particles were then collected from the bottom of the cabinet and returned to the pressure pot. This blasting cycle was repeated to give breakdown data for the grit particles at 5 and 10 cycles. At the conclusion of each test, representative samples of blasted grit particles were separated in a 2-way Jones riffle splitter, reducing the sample size from approximately 30 lbs to 9 to 10 ounces.

The following mesh analysis results were obtained for Type A 12/30, Type B 12/30 and ENVIROSTRIP™ 12/30, when blasted for 5 and 10 cycles as described above.

Comparison of Abrasive Grit Particle Size after Five Blast cycles of Type A 12/30, Type B 12/30, and ENVIROSTPIP™ 12/30

| Abrasive grit | Mesh size (% of total sample) | | | | | | |
| --- | --- | --- | --- | --- | --- | --- | --- |
| | 30 | 40 | 50 | 60 | 80 | 100 | Pan |
| Type A 12/30 | 20.7 | 22.2 | 26.5 | 8.9 | 10.9 | 4.5 | 7.1 |
| Type B 12/30 | 39.5 | 21.3 | 19.5 | 5.6 | 7.0 | 3.2 | 6.6 |
| ENVIROSTRIP ™ 12/30 | 8.8 | 14.2 | 23.9 | 9.9 | 16.4 | 8.4 | 19.5 |

Comparison of Abrasive Grit Particle Size after Ten Blast cycles of Type A 12/30, Type B 12/30, and ENVIROSTRIP™ 12/30

| Abrasive grit | Mesh size (% of total sample) | | | | | | |
| --- | --- | --- | --- | --- | --- | --- | --- |
| | 30 | 40 | 50 | 60 | 80 | 100 | Pan |
| Type A 12/30 | 6.0 | 8.9 | 18.0 | 10.6 | 16.8 | 10.0 | 32.0 |
| Type B 12/30 | 12.3 | 17.1 | 25.9 | 10.1 | 14.8 | 6.8 | 13.0 |
| ENVIROSTRIP ™ 12/30 | 1.1 | 4.5 | 14.5 | 8.5 | 18.5 | 11.5 | 40.3 |

In commercial applications of ENVIROSTRIP™ 12/30, it has been determined that spent grit particles which pass through a 100 mesh screen have relatively poor paint removal efficiency and therefore, are not considered to be desirable for use. The breakdown rate of each grit particle may therefore, be defined as the amount of material lost through a 100 mesh screen after each blast cycle, or as the average loss of material per cycle based on the results after ten blast cycles.

After ten cycles the high amylose Type A 12/30 and Type B 12/30 grit particles resulted in an average 3.2% and 1.3% loss per blast cycle, respectively, as compared to a 4% loss per blast cycle for ENVIROSTRIP™ 12/30 grit particles.

The Type B 12/30 grit particles with the highest amylose content exhibited the greatest impact resistance. Expressed in terms of product longevity, the Type B 12/30 grit particles last approximately three times longer than the commercially available ENVIROSTRIP™ grit particles.

EXAMPLE 9

The high amylose glass-like polysaccharide grit particles of the present invention have minimal mechanical effects on sensitive surfaces such as aluminum. High amylose Type A 12/30 grit particles described in Example 3 and Type B 12/30 grit particles described in Example 4, were compared to commercially available ENVIROSTRIP™ Starch Media (ADM/Ogilvie) of the same grit particle size.

The residual stress induced by each product was measured by the Aero Almen Testing procedure, under the same blasting procedure and blast conditions as in Example 7. Aero almen specimens were prepared from bare aluminum sheet 0.032 inch thick, meeting specification QQ-A-250-05F-T3. Each almen specimen measured 3.0-inch by 0.75-inch.

The stress induced by the grit particles was measured by blasting four specimens, mounted on a block with screws, and measuring the arc height of each specimen with an Electronics Inc. Almen Gage Instrument. This procedure was repeated at intervals of 5, 10, 20, 40 and 60 seconds to give results at various dwell times and an indication of total stress induced at saturation. The higher the arc or deflection of the aluminum specimen, reported in inches, the greater the induced stress measured.

The following almen arc height results were obtained for Type A 12/30, Type B 12/30 and ENVIROSTRIP™ 12/30 grit particles when tested as described above.

Comparison of Almen Arc Heights Obtained for Type A 12/30, Type B 12/30, and ENVIROSTRIP™ 12/30

| Dwell time | Almen arc height (in inches) | | | | |
| --- | --- | --- | --- | --- | --- |
| | 5 sec | 10 sec | 20 sec | 40 sec | 60 sec |
| Abrasive grit | | | | | |
| Type A 12/30 | 0.0021 | 0.0026 | 0.0033 | 0.0037 | 0.0041 |
| Type B 12/30 | 0.0021 | 0.0024 | 0.0028 | 0.0034 | 0.0039 |

Plastic blast media are generally considered to be too aggressive for many aerospace paint removal applications, since they impart too much residual stress on the surfaces being stripped or cleaned. Almen arc height measurements for Type V PolyPlus 20/40 Plastic Abrasive (manufactured by U.S. Technology Inc.) are typically as high as 0.0080 inch arc height at saturation (60 sec. dwell time).

In contrast, starch based blast media induce less stress when compared to plastic blast media. The mechanical effects associated with ENVIPOSTRIP™ 12/30 wheat starch based grit particles are considered to be minimal. The stress induced on aluminum by the high amylose grit particles, Type A 12/30 and Type B 12/30, is not substantively different from that obtained with the commercially accepted ENVIROSTRIP™ grit particles.

EXAMPLE 10

The mechanical affects of grit particles may also be measured in terms of surface roughness. High amylose Type A 12/30 grit particles described in Example 3 and Type B 12/30 grit particles described in Example 4, were compared to commercially available ENVIROSTRIP™ Starch Media (ADM/Ogilvie) of the same grit particle size.

The surface roughness of aluminum panels stripped with Type A 12/30, Type B 12/30 and ENVIROSTRIP™ 12/30 grit particles was determined under the same blasting procedure and blast conditions as in Example 7. The surface roughness measurement was performed on the stripped area of each painted clad aluminum panel using a Mitutoyo MST-301 instrument, calibrated using a precision reference. Each stripped area of a panel was scanned six times using a cut off length of 0.030 inch×5. The roughness average (Ra) values of the clad aluminum surface for the grit particles are presented in the table below.

Comparison of Surface Roughness Average (Ra) obtained for Type A 12/30, Type B 12/30, and ENVIROSTRIP ™ 12/30

| Abrasive grit | Surface Roughness Average (Ra) (in microinches) |
| --- | --- |
| Type A 12/30 | 126 |
| Type B 12/30 | 117 |
| ENVIROSTRIP ™ 12/30 | 103 |

Plastic abrasive media are generally considered too aggressive for stripping clad aluminum. The roughness average (Ra) values for clad aluminum subjected to Type V PolyPlus 20/40 Plastic Abrasive (manufactured by US Technology Inc.) are typically over 200 microinches.

In contrast, starch-based abrasive media provides a very smooth finish on clad aluminum when compared to processes employing plastic abrasive blast media. The mechanical effects associated with ENVIROSTRIP™ 12/30 wheat starch grit particles are considered to be minimal. The surface finish of clad aluminum panels treated with the high amylose Type A 12/30 and Type B 12/30 grit particles is not substantively different from that obtained with the commercially accepted and approved ENVIROSTRIP™ grit particles.

It will be apparent to those skilled in the art that modifications may be made without departing from the spirit and scope of the invention. Accordingly, it is not intended that the invention be limited except in view of the appended claims.

What is claimed is:

1. A process for producing abrasive water-resistant polysaccharide grit particles comprising the steps of:
    (a) providing an aqueous dispersion of polysaccharides having an average amylose content of at least 45% by weight;
    (b) heating said dispersion at a temperature and for a time sufficient to form a gel;
    (c) subdividing and cooling the gel to form a glass-like solid material; and
    (d) grinding the glass-like solid material to form glass-like polysaccharide grit particles having an apparent hardness of up to about 4.0 moh and an average moisture content of at least 5%.

2. The product produced by the process of claim 1 wherein the glass-like polysaccharide grit particles are water-resistant such that after being subjected to contact with water, they retain their particulate integrity for use as grit particle blast media.

3. The product produced by the process of claim 1 wherein, when viewed under ultraviolet light, the glass-like polysaccharide grit particles exhibit fluorescence which is easily visible to the unaided eye.

4. The process of claim 1 wherein after the gel is formed, it is cooled before subdividing.

5. The process of claim 1 wherein all of the polysaccharides have an amylose content of at least 45% by weight.

6. The process of claim 5 wherein all of the polysaccharides have an average amylose content of at least 50% by weight.

7. The process of claim 6 wherein the polysaccharides have an average amylose content of at least 70% by weight.

8. The process of claim 1 wherein the average moisture content of the glass-like polysaccharide grit particles is from 5% to about 30% by weight.

9. The process of claim 8 wherein the average moisture content of the glass-like polysaccharide grit particles is from about 10% to about 20% by weight.

10. The process of claim 1 wherein the aqueous polysaccharide dispersion comprises a starch having a dextrose equivalent of less than 10.

11. The process of claim 10 wherein the starch has a dextrose equivalent of less than 1.

12. The process of claim 1 wherein the glass-like solid material is ground to form polysaccharide grit particles ranging in size from about 12 U.S. mesh to less than 100 U.S. mesh.

13. The process of claim 12 wherein the glass-like solid material is ground to form polysaccharide grit particles ranging in size from about 16 U.S. mesh to about 60 U.S. mesh.

14. A process for producing abrasive water-resistant polysaccharide grit particles comprising the steps of:
    (a) providing an aqueous dispersion of polysaccharides in which all polysaccharides have an amylose content of at least 45% by weight;
    (b) heating the dispersion at a temperature and for a time sufficient to form a gel;
    (c) subdividing and cooling the gel to form glass-like solid material; and
    (d) grinding the glass-like solid material to form glass-like polysaccharide grit particles which, when viewed under ultraviolet light, exhibit a high degree of fluorescence which is easily visible to the unaided eye, and which have an apparent hardness of up to about 4.0 moh and an average moisture content of at least 10%.

15. The glass-like polysaccharide grit particles produced by the process of claim 14.

16. The glass-like polysaccharide grit particles produced by the process of claim 1.

* * * * *